Patented Nov. 20, 1928.

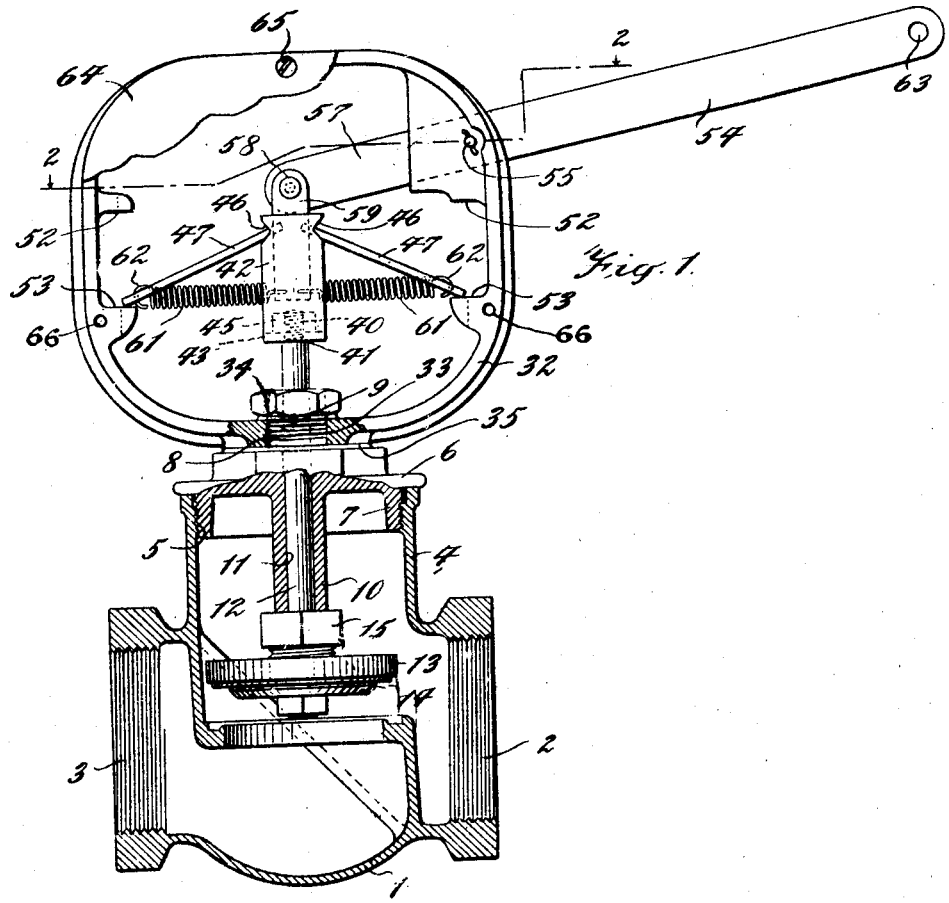
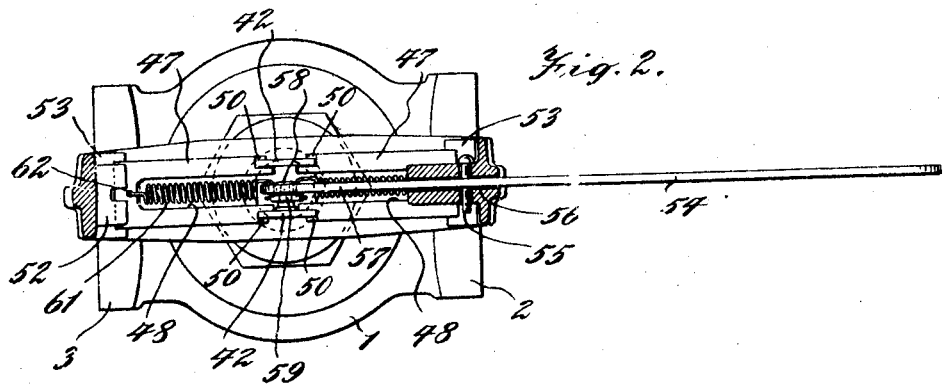

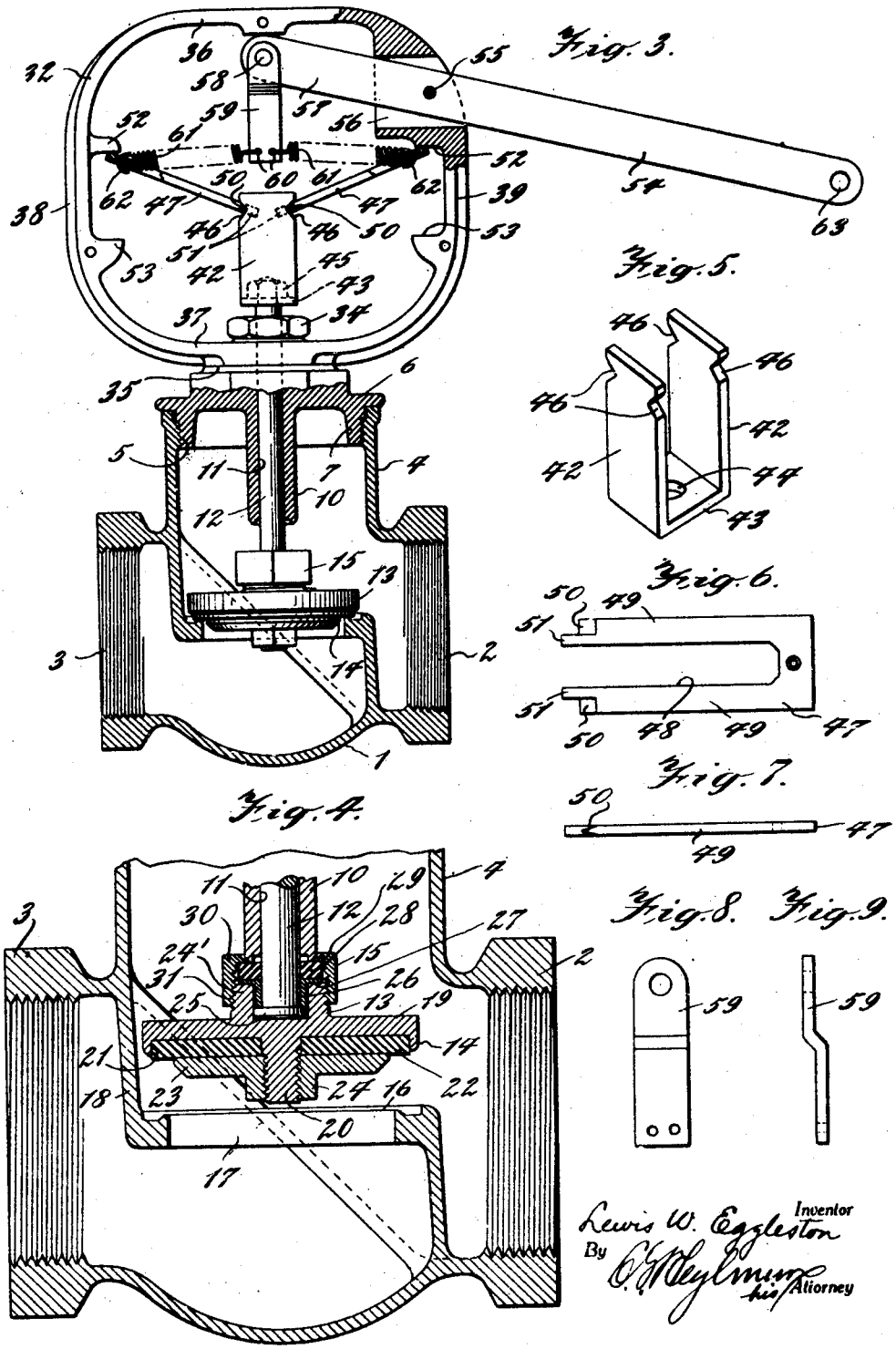
Nov. 20, 1928.
L. W. EGGLESTON
VALVE
1,692,770
Original Filed March 1, 1923    2 Sheets-Sheet 2

1,692,770

UNITED STATES PATENT OFFICE.

LEWIS W. EGGLESTON, OF CLARENCE TOWNSHIP, ERIE COUNTY, NEW YORK, ASSIGNOR TO AMERICAN RADIATOR COMPANY, OF NEW YORK, N. Y., A CORPORATION OF NEW JERSEY.

VALVE.

Application filed March 1, 1923, Serial No. 622,062. Renewed July 2, 1926.

My invention relates to new and useful improvements in operating means for valves adapted to control the flow of gas or liquid through a port or conduit.

The primary object of the invention is to provide an improved and simple operating means for a valve or its equivalent, which means will be prompt and positive in its action, and efficient in operation.

A further object is to provide an operating means which will hold a valve in either its open or closed positions without binding action on the valve, its stem, or the operating parts.

A further object is to provide an operating means which will promptly and positively operate a valve without exerting any undue force thereon which would tend to cause the valve to bind or stick in its movements.

A further object of the invention is to provide an operating means which will be void of dead centers or dwells tending to impede or prevent free and easy movement of the parts.

The invention consists in the improvements and combination of parts to be fully described hereinafter, and the novelty of which will be particularly pointed out and distinctly claimed.

I have fully and clearly illustrated a preferred embodiment of my invention in the accompanying drawings to be taken as a part of these specifications and wherein—

Figure 1 is a view in side elevation, partly in central vertical section, the operating means being shown in position when holding a valve member in open position;

Fig. 2 is a section on the line 2—2 of Fig. 1;

Fig. 3 is a view similar to Fig. 1, but showing the operating means in the position it assumes when holding a valve member in closed position;

Fig. 4 is an enlarged detailed section through one type of valve to which the invention is applicable;

Fig. 5 is a perspective view of a connecting member forming part of the operating means;

Fig. 6 is a plan view of an operating lever;

Fig. 7 is an edge view of the lever shown in Fig. 6;

Fig. 8 is a face view of a connecting link, and

Fig. 9 is an edge view of the link shown in Fig. 8.

Referring to the drawings by characters of reference, 1 designates a valve casing of any suitable construction, the same, for the purposes of this application and a disclosure of my invention, being preferably but not necessarily of the globe type. The valve casing 1 may be provided with connection nipples 2, 3, by means of which connection may be made with suitable sections of pipes or other conduits, and at its upper portion said casing is provided with a tubular extension 4. The extension 4 is internally threaded, as at 5, and closing the outer end of said extension is a plug 6 having an externally threaded flange 7 engaging the threads 5. The plug is provided on its outer end with a central boss 8 externally threaded, as at 9, for a purpose to be presently described. The under or inner side of the plug 6 is provided with an inwardly projecting sleeve 10, and through said plug, boss and sleeve, is a guide-bore 11, in which is slidably mounted a valve rod or stem 12, carrying at its lower end a valve structure 13, including a main valve 14 and a secondary valve 15. The valve 14 is arranged to cooperate with a valve seat 16 surrounding a port 17 in a diaphragm wall 18 in the valve casing, and the valve 15 is adapted to cooperate with the inner end of the said tubular extension or sleeve 10, in a manner and for a purpose which will presently appear. The valve structure may be of any suitable construction, but preferably comprises a disk 19, having a central threaded stud 20, and an annular recess 21, in which is seated a packing-washer 22, the latter being held in place by a washer-plate 23 having a wrench head 24, and threaded onto the stud 20, said packing-washer being adapted to cooperate with the seat 16 when the port 17 is closed by the valve.

The disk 19 is formed on its upper face with a hollow boss 24' adapted to receive a head 25 on the inner end of the stem 12. Also within the boss 24' is a sleeve 26 surrounding the stem 12 and cooperating at one end with a shoulder provided by the head 25, the opposite end of said sleeve or bushing having a lateral flange 27 resting upon the outer end of said boss. Surrounding the stem 12 and resting upon the flange 27, is a packing-washer 28, the same being held in place by an internal flange 29 on a clamping nut 30, threaded, as at 31, onto the boss 24'. There is sufficient space between the inner edge of the flange 29 and the stem 12 to expose the upper surface of the washer 28 so that the latter may contact the inner end of the tubular member 10 when the valve structure is moved to open the port 17, whereby the space between the stem 12 and member 10 will be sealed, as clearly shown in Figs. 1 and 4 of the drawings.

While I have described above a preferred construction of a valve, it will be understood that the operating means which will now be described is not limited thereto.

Mounted preferably upon the valve body is a frame or casing structure 32, the same being provided at its lower portion with an opening 33 adapted to receive the boss 9 heretofore described, said frame being clamped in position by a clamping nut 34 threaded onto the end of said boss projecting through the frame, the latter being rigidly clamped in position between the said nut and a flat surface 35 on the valve body. The said frame is composed of upper and lower horizontal members 36, 37, the latter of which contains the opening 33, and side members 38, 39, said members lying in a substantially vertical plane.

The valve stem 12, at its end opposite to that carrying the valve structure 13, projects into the frame or casing 32, and is threaded, as at 40, a shoulder 41 being provided at the base of the said threaded portion.

The threaded upper end of the stem affords means for attachment of the stem to a connecting member comprising vertical parallel plates 42, connected at their lower ends by a bridge-piece 43 having an opening 44 through which said threaded portion 40 projects, said connecting member being held on the stem by a nut 45 threaded onto the stem and holding the bridge-piece 43 against the shoulder 41. Each of the members 42 is provided on its opposite side edges with notches 46 adapted to serve as fulcrum points for motion-transmitting levers, to be now described. 47, 47 designate rigid, motion-transmitting members, preferably in the form of levers adapted to impart motion to the valve stem 12, said levers being arranged to project in opposite directions from the connecting member 42, and to swing through planes parallel to the direction of movement of said stem. Each lever preferably consists of a flat plate provided with a longitudinal slot 48 opening at one end through the end of the plate, so as to provide said plate with spaced members or legs 49. The legs 49 are each provided with fulcrums 50, preferably knife-edged, adapted to be seated in the fulcrum notches 46 on adjacent edges of the members 42. The legs 49 may also be provided with guide-lugs or extensions 51 extending into the space between the members 42 and co-operable with the inner faces thereof to prevent lateral displacement of said levers from their intended relation to the connecting member, and also to guide the levers in their swinging movement relative to said member.

The frame member 32 is provided on each of its side members 38, 39, with oppositely disposed spaced stops, preferably in the form of lugs 52, 53, respectively, integral with said side members and projecting inward therefrom, and between which the outer or swinging ends of the lever 47 move, said stops serving to limit the extent of movement of said levers in the manner and for the purpose to be presently described.

54 designates an operating lever fulcrumed at a point intermediate its ends, as at 55, in a slot 56, through the surrounding member of the frame 32, one end of said lever projecting into the frame, as at 57, and carrying a pivot pin 58 from which is pivotally suspended a connecting means, preferably in the form of a link 59 substantially in longitudinal alinement with the valve stem 12. At its lower end the link 59 is suitably connected, as at 60, to the inner ends of oppositely-extending tension or contractile springs 61, the outer ends of which are suitably connected, as at 62, to the outer end portions of the levers 47 heretofore described. The arrangement of parts is such that the springs operate at all times to tend to draw the outer ends of said levers toward each other. The points of connection of the springs with the link 59 are within the space between the fulcrums 50 of the levers 47.

The outer end of the lever 54 is provided with an aperture 63, by means of which it may be connected to any suitable operating device or mechanism, such, for example, as a thermostatic or pressure-responsive device.

The operation of the preferred embodiment of my invention above described is as follows:

In Fig. 1 the parts are shown in the position taken when acting to hold the valve 14 open or away from its seat 16, under which conditions the inner ends of the springs are located beneath the fulcrums 46, and the outer ends of the levers 47 are directed downward into engagement with the lower stops 53, the springs exerting their force through the levers 47 on the connecting member 42 to hold the parts in the position shown. It will be noted that in the position just described, the disk 28 is held in sealing relation to the lower end of the tubular member 10.

Should the conditions controlling the operation of the lever 54 be such that the valve 14 is to be closed, the said lever is moved by the temperature or pressure-responsive means from the position shown in Fig. 1 to that shown in Fig. 3. This movement raises the inner end 57 of said lever 54, which causes the link 59 to be moved until the lower end thereof is raised to a position above the fulcrums 46, whereupon the springs contract to draw the outer ends of the levers 47 together and into engagement with the upper stops 52. When the ends of the levers strike the stops 52, the spring force is then exerted through the levers onto the member 42 to quickly thrust the stem 12 in the proper direction to seat the valve 14 on its seat 16 by a snap action, in which position said valve will be securely held until the lever 54 is operated to move the springs into position below the fulcrums 46.

When the valve is to be raised from its seat, the lever 54 is moved from the position shown in Fig. 3 to that shown in Fig. 1. As soon as the lower end of the link 59 is moved to carry the inner ends of the springs to a point below the fulcrums 46, the springs throw the outer ends of the levers 47 toward each other in the opposite direction they assume when the valve is closed, said levers striking the stops 53 and thereby exerting a thrust on the valve stem to raise valve 14 from its seat 16 and move the disk 28 into sealing contact with the sleeve 10. By virtue of the spring force acting on the levers against stops 52, the levers serve to hold the valve in open position.

By the construction described, I provide an operating means which serves to efficiently hold the valve in either of the desired positions, but which is particularly sensitive and prompt in action when the controlling means operates the lever 54 to an extent demanding operation of the valve from one of its positions to another. It will also be seen that the levers are prevented from dwelling in any dead center position as the forces are exerted on the levers 47 so that they are swung from one position to the other the very instant the inner ends of the springs take position a very slight distance either to one side or the other of the fulcrum points between the levers and the member 42.

During the operation, the levers 47 and springs freely pass each other, as the springs may pass through the slots 48, heretofore described, in said levers.

If desired, the sides of the frame may be closed by enclosing plates 64 secured to the frame at suitable points by screws 65 passing through the same into openings 66 in the frame.

What I claim and desire to secure by Letters Patent of the United States is:—

1. A valve of the character described, comprising a casing, a valve in the casing, an element adapted to move said valve, oppositely disposed, rigid members fulcrumed on said element and the outer ends of which are movable to positions on opposite sides of the fulcrums of said members, spring means for swinging the outer ends of said members toward each other and acting on said element to operate the valve, fixed means for limiting the swinging movement of said members, and means for shifting said spring means to points on opposite sides of said fulcrums, whereby said members may act alternately in opposite directions on said element.

2. A valve of the character described, comprising a casing, a valve in the casing, an element adapted to move said valve, oppositely disposed, rigid members fulcrumed on said element and the outer ends of which are movable to positions on opposite sides of the fulcrums of said members, spring means for swinging the outer ends of said members toward each other and acting on said element to operate the valve, fixed means for limiting the swinging movement of said members, a member connected to said spring means, and operating means for moving said member to shift said spring means to points on opposite sides of said fulcrums, whereby said members may act alternately in opposite directions on said element.

3. A valve of the character described, comprising a casing, a valve in the casing, an element adapted to move said valve, oppositely disposed members fulcrumed on said element and the outer ends of which are movable to positions on opposite sides of the fulcrums of said members, spring means for swinging the outer ends of said members toward each other and acting on said element to operate the valve, means for limiting the swinging movement of said members, a link member connected to said spring means, and operating means for moving said link member to shift said spring means to points on opposite sides of said fulcrums, whereby said members may act alternately in opposite directions on said element.

4. A valve of the character described, comprising a casing, a valve in the casing, an element adapted to move said valve, oppositely disposed levers fulcrumed at their inner ends on said element and the outer ends of which are movable to positions on opposite sides of the fulcrums of said levers, spring means acting directly on said levers for swinging the outer ends of said levers toward each other, means for limiting the swinging movement of said levers, and means for shifting said spring means to points on opposite sides of said fulcrums.

5. A valve of the character described, comprising a casing, a valve in the casing, a valve stem, oppositely disposed members having their inner ends fulcrumed on said stem and having their outer ends movable to positions on opposite sides of said fulcrums, a link member, springs having the inner ends thereof connected to said link member and the outer ends thereof connected to said oppositely disposed members, an operating member connected to said link member, and means for limiting the movements of said oppositely disposed members.

6. A valve of the character described, comprising a casing, a valve in the casing, an element adapted to move said valve, oppositely disposed members having the inner ends thereof fulcrumed on said element and the outer ends of which are movable to positions on opposite sides of the fulcrums of said members, oppositely disposed contractile springs having their outer ends connected to said members, and means connected to the inner ends of said springs for moving the latter so that the forces thereof may be directed in lines on either side of said fulcrums.

7. A valve of the character described, comprising a casing, having a valve seat, a valve closure cooperable with said seat, a valve stem for moving said closure relative to said seat, oppositely-extending levers fulcrumed at their inner ends on said stem, operating means, springs connecting the outer ends of said levers with said operating means, and means for limiting the swinging movement of said levers.

8. A valve of the character described, comprising a casing, having a valve seat, a valve closure cooperable with said seat, a valve stem for moving said closure relative to said seat, oppositely-extending levers fulcrumed at their inner ends on said stem, operating means, springs connecting the outer ends of said levers with said operating means, and means for limiting the swinging movement of said levers and comprising opposite pairs of spaced stops between which said levers swing.

9. A valve of the character described, comprising a casing, having a valve seat, a valve closure cooperable with said seat, a valve stem for moving said closure relative to said seat, oppositely disposed levers each having one end fulcrumed on said stem, operating means movable in line with the longitudinal axis of said stem, and oppositely-extending tension springs connecting the swinging ends of said levers with said operating means.

10. A valve of the character described, comprising a casing, having a valve seat, a valve closure cooperable with said seat, a valve stem for moving said closure relative to said seat, oppositely-disposed levers each having one end fulcrumed on said stem, operating means movable in a line longitudinally of said stem, oppositely-extending tension springs connecting the swinging ends of said levers with said operating means, and stops on opposite sides of said fulcrums for limiting the swinging movement of said levers.

11. A valve of the character described, comprising a casing, having a valve seat, a valve closure cooperable with said seat, a valve stem for moving said closure relative to said seat, oppositely disposed levers each having one end fulcrumed on said stem, a link member movable in line with the longitudinal axis of said stem, and oppositely-extending tension springs connecting the swinging ends of said levers with said link member.

12. A valve of the character described, comprising a casing, having a valve seat, a valve closure cooperable with said seat, a valve stem for moving said closure relative to said seat, oppositely disposed levers each having one end fulcrumed on said stem, operating means movable in a line longitudinally of said stem, oppositely-extending tension springs connecting the swinging ends of said levers with said operating means, and stops located on opposite sides of said fulcrums and cooperating with said levers to limit swinging movement thereof.

13. A valve of the character described, comprising a casing, having a valve seat, a valve closure cooperable with said seat, a valve stem for moving said closure relative to said seat, a connecting member mounted on said stem, oppositely disposed levers fulcrumed at their inner ends on said connecting member, stops arranged on opposite sides of said fulcrums and adapted to limit swinging movement of said levers, an operating member, and springs having their outer ends connected to said levers and their inner ends connected to said operating member whereby the springs may be moved to positions on either side of said fulcrums.

14. A valve of the character described, comprising a casing, having a valve seat, a valve closure cooperable with said seat, a valve stem for moving said closure relative to said seat, a connecting member mounted on said stem, oppositely disposed levers fulcrumed at their inner ends on said connecting member, stops arranged on opposite sides of said fulcrums and adapted to limit swinging movement of said levers, an operating member, a link pivotally connected to the operating member, and springs having their outer ends connected to said levers and their inner ends connected to said link whereby the springs may be moved to positions on either side of said fulcrums.

15. A valve of the character described, comprising a casing, having a valve seat, a valve closure cooperable with said seat, a valve stem for moving said closure, a connecting member on the valve stem and including parallel plates, levers fulcrumed on said plates, stops located on opposite sides of said fulcrums to limit the swinging movement of said levers, an operating member, and springs connecting said levers and said operating member whereby said springs may be moved to positions on either side of said fulcrums.

16. A valve of the character described, comprising a casing, having a valve seat, a valve closure cooperable with said seat, a valve stem for moving said closure, a connecting member on the valve stem and including parallel plates, levers fulcrumed on said plates, means for guiding said levers relative to said plates, stops located on opposite sides of said fulcrums to limit the swinging movement of said levers, an operating member, and springs connecting said levers and said operating member whereby said springs may be moved to positions on either side of said fulcrums.

17. A valve of the character described, comprising a casing, having a valve seat, a valve closure cooperable with said seat, a valve stem for moving said closure, a connecting member on the valve stem and including parallel plates, levers fulcrumed on said plates, guide extensions on said levers and cooperating with said plates to guide the levers relative to the plates, stops located on opposite sides of said fulcrums to limit the swinging movement of said levers, an operating member, and springs connecting said levers and said operating member whereby said springs may be moved to positions on either side of said fulcrums.

18. A valve of the character described, comprising a casing, having a valve seat, a valve closure cooperable with said seat, a valve stem for moving said closure relative to said seat, a connecting member mounted on the valve stem and including spaced plates, oppositely disposed slotted levers fulcrumed on said plates, stops on opposite sides of said fulcrums for limiting swinging movement of the levers, operating means, and springs connecting said levers with said operating means and adapted to pass through said slots upon swinging movement of said levers.

19. A valve of the character described, comprising a casing, a valve in the casing, an element adapted to move said valve, oppositely disposed members fulcrumed on said element, fixed stops in the paths of movement of said members, and means to move said members into engagement with said stops, the force exerted by said means reacting through said members to move said element.

In witness whereof I have hereunto signed my name.

LEWIS W. EGGLESTON.